Patented Jan. 11, 1944

2,338,812

UNITED STATES PATENT OFFICE 2,338,812

WELD ROD

Stanley R. Hood, Birmingham, Mich., assignor to W. M. Chace Company, Detroit, Mich., a corporation of Michigan No Drawing. Application December 4, 1941, Serial No. 421,633

2 Claims. (Cl. 219—8)

This invention relates to a weld rod.

A weld rod or weld metal should produce a strong, ductile weld having a minimum of internal stresses. It is the object of this invention to produce a weld rod or weld metal that will pass from a molten condition to a solid at room temperature and produce a weld that has high strength over a wide range of temperature, that is free from cracks, ductile and has a minimum of internal stress. This invention contemplates a weld rod which produces a better weld than those now in use and which is more economical to use.

A welding rod having all of the above advantages and desirable characteristics is one fabricated from an alloy comprising essentially iron and one or more metals that will produce a ferritic single phase alloy such as molybdenum, chromium, vanadium, copper, aluminum and tungsten. An iron-molybdenum alloy is preferred. In such alloy the molybdenum can be varied within a range from about 2% to about 5% by weight of the alloy with the balance iron. Although carbon is not essential to the alloy, a carbon content from about .05% to .20% by weight is very practical. A higher carbon content causes brittleness in the weld. If the molybdenum content is progressively increased above 5% by weight, then at room temperature the degree of brittleness of the weld produced by such rod increases commensurately.

This welding rod will produce a weld which has high strength over a wide range of temperatures such, for example, as from room temperature to as high as 2300° F. At the latter temperature the weld produced by this weld rod will have a higher strength than Invar. This alloy will have higher strength and higher ductility over a much wider temperature than stainless steel. Further, this iron-molybdenum alloy can be hot and cold rolled without fracture. For this reason this weld rod or weld metal is particularly useful in the manufacture of Bimetal. In fabricating Bimetal it is common practice to arc weld along their edges with stainless steel (chromium 18%, nickel 8%, balance iron) a billet of high expansion alloy and a billet of low expansion alloy preparatory to heating the two billets for hot rolling which is followed by cold rolling. The weld along the edge of the two billets keeps the air out from between the two billets while being heated preparatory to and during hot rolling. The stainless steel weld metal is removed prior to cold rolling because it fractures during cold rolling. This iron-molybdenum alloy is very useful for this purpose because it will not develop cracks either before or during both hot and cold rolling.

Due to the high tensile strength and ductility of the weld produced by this weld rod, this weld rod may be useful for welding together the armor plate on tanks and the welding of low alloy steels.

Other ferrite formers can be substituted for or used in combination with molybdenum within the range in which they or their combinations form ferritic alloys. These metals and their respective ranges in which they are ferritic are chromium, 15%–40%; vanadium, 2%–27%; copper up to .3%; aluminum, 2%–5%; tungsten, 6%–8%; balance iron in all cases.

I claim:

1. A weld rod comprising essentially an alloy of tungsten and iron, the tungsten being present in said alloy in an amount falling within a range of from about 6% to about 8% by weight of the alloy and the balance of said alloy being iron.

2. A weld rod comprising essentially a ferritic alloy of molybdenum, tungsten and iron having the following composition: tungsten not more than 8%, molybdenum not more than 5%, and the balance iron, the sum of the amounts of molybdenum and tungsten being at least 2% of the alloy.

STANLEY R. HOOD.